(12) United States Patent
Kelley et al.

(10) Patent No.: US 8,737,596 B2
(45) Date of Patent: May 27, 2014

(54) REAL-TIME COLLABORATION CENTER

(75) Inventors: Mark A. Kelley, Brentwood, NH (US); Michael S. Wengrovitz, Concord, MA (US)

(73) Assignee: Alcatel Lucent, Paris (FR)

( * ) Notice: Subject to any disclaimer, the term of this patent is extended or adjusted under 35 U.S.C. 154(b) by 1397 days.

(21) Appl. No.: 11/864,971

(22) Filed: Sep. 29, 2007

(65) Prior Publication Data
US 2009/0086957 A1 Apr. 2, 2009

(51) Int. Cl.
*H04M 3/00* (2006.01)

(52) U.S. Cl.
USPC .................................................. 379/265.09

(58) Field of Classification Search
CPC ..... H04M 3/5191; H04M 3/523; H04M 3/51; H04M 3/5141; H04M 3/5183; H04M 2203/404; H04M 3/527; H04M 3/52
USPC ............. 379/265.01, 265.02, 265.09, 265.11, 379/266.01; 709/205, 217, 219
See application file for complete search history.

(56) References Cited

U.S. PATENT DOCUMENTS

| | | | |
|---|---|---|---|
| 2001/0016873 A1* | 8/2001 | Ohkado et al. | 709/205 |
| 2004/0208307 A1* | 10/2004 | Walker et al. | 379/265.01 |
| 2005/0141694 A1 | 6/2005 | Wengrovitz | |

* cited by examiner

*Primary Examiner* — Antim Shah
(74) *Attorney, Agent, or Firm* — Capitol Patent & Trademark Law Firm, PLLC

(57) ABSTRACT

A real-time collaboration center and method for using the same are described herein which enables a caller (end-user) to have a real-time collaboration session with a call center agent. In one embodiment, the real-time collaboration center is able to create a new real-time collaboration session for a caller where the caller is routed to the real-time collaboration session in which they might be joined by an automated call center agent which could provide product information and/or gather information to/from the caller while they wait for the live call center agent. When a live call center agent with the appropriate skill set becomes available, then he/she receives an invitation to join the real-time collaboration session where the two parties can then interact with voice, instant messaging, application/desktop sharing, and other media.

14 Claims, 7 Drawing Sheets

REAL-TIME COLLABORATION CENTER

CROSS REFERENCE TO RELATED APPLICATION

This application is related to U.S. patent application Ser. No. 11/020,812 filed on Dec. 22, 2004 and entitled "Real-Time Communications Call Center Server". The contents of this document are incorporated by reference herein.

TECHNICAL FIELD

The present invention relates to a real-time collaboration center and method for using the real-time collaboration center to enable a caller (end-user) to collaborate using voice and data with a call center agent.

BACKGROUND

The following abbreviations are herewith defined, at least some of which are referred to in the following description associated with the prior art and the present invention.

| | |
|---|---|
| CTI | Computer Telephony Integration |
| DTMF | Dual Tone Multi-Frequency |
| GUI | Graphical User Interface |
| HTTP | Hyper Text Transfer Protocol |
| ID | Identification |
| IM | Instant Messaging |
| IP | Internet Protocol |
| IVR | Interactive Voice Response |
| PBX | Private Branch Exchange |
| URL | Uniform Resource Locator |
| VCS | Voice Communications System |
| XML | Extensible Markup Language |

Call centers provide vital communication links between consumers and businesses. In present call center systems, a consumer places a telephone call via the standard public telephone network to the main toll-free number of the call center, and then interacts with an IVR system that acts to deduce the caller's intent. In IVR implementations based on DTMF, a caller may have to progress through a chained series of different DTMF menus to specify his or her intent. The callers often become frustrated with this slow and cumbersome process, only to discover that in their case, as in many cases, there is actually no DTMF menu item that correctly matches their intent. In some cases, the caller may opt-out by depressing the "0" key to speak with a call center human operator so they can more quickly and accurately specify his or her intent but the call center operator often has to spend more time on these types of calls thus incurring additional call center expense. In other cases, the caller may become frustrated, discontinue the call, and not purchase additional products from this company because of the poor level of customer service and support.

As telephony networks evolve from conventional circuit-switched public telephone networks to packet-switched voice and data IP-based networks, new forms of call centers based on voice/data convergence will emerge. For instance, a caller (end-user) could use a web client (computer) to interact with a call center agent by using instant messenger technology, including for example Yahoo! Instant Messenger, MSN Messenger, AOL Instant Messenger. In addition, Microsoft Corporation has introduced a service known as Microsoft Net-Meeting® which provides online conferencing and collaboration sessions across the Internet which could be used to enable a caller (end-user) to use their web client (computer) to interact with a call center agent. Although these technologies enable a caller (end-user) to interact with a call center agent they still have drawbacks such as for example with the Microsoft NetMeeting® the end-user would need to install proprietary software on their computer or mobile device before communicating with the call center agent. This is not desirable. Accordingly, there is a need for a new call center which does not suffer from this drawback while still enabling a caller (end-user) to use the converging voice/data technologies to interact with a call center agent. This need and other needs are satisfied by a real-time collaboration center and method of the present invention.

SUMMARY

In one aspect, the present invention provides a method for establishing a real-time collaboration session between an end-user and a call center agent. The method comprising the steps of: (a) receiving, at an application server, a request from an end-user who wants to have a real-time collaboration session with a call center agent; (b) forwarding, from the application server, a service call to a collaboration server; (c) establishing a new conference at the collaboration server; (d) forwarding, from the collaboration server, a response having conference details about the new conference to the application server; (e) forwarding, from the application server, a conference invitation having conference details about the new conference to a queuing server; (f) queuing, at the queuing server, the conference invitation until the call center agent becomes available to interact with the end-user; (g) connecting the end-user to the new conference which is hosted by the collaboration server so the end-user can wait until the call center agent becomes available and accepts the conference invitation from the queuing server so the call center agent can join the new conference and take part in the real-time collaboration session; and (h) if desired the collaboration server enables an automated call center agent to interact with and gather information from the end-user in the new conference while the end-user is waiting for the call center agent to join the new conference and take part in the real-time collaboration session.

In another aspect, the present invention provides a real-time collaboration center which includes the following components: (a) an application server that receives a request from an end-user who wants to have a real-time collaboration session with a call center agent; (b) a collaboration server that receives a service call from the application server and upon receiving the service call establishes a new conference; (c) the application server receives a response having conference details about the new conference from the collaboration server; (d) a queuing server that receives a conference invitation having conference details about the new conference from the application server and then queues the conference invitation until the call center agent becomes available to interact with the end-user; (e) the application server forwards the end-user to the new conference hosted by the collaboration server so the end-user can wait until the call center agent becomes available and accepts the conference invitation from the queuing server so the call center agent can join the new conference and take part in the real-time collaboration session; and (f) the collaboration server if desired can enable an automated call center agent to interact with and gather information from the end-user in the new conference while the end-user is waiting for the call center agent to join the new conference and take part in the real-time collaboration session.

In yet another aspect, the present invention provides a method for enabling an end-user to establish a real-time collaboration session with a call center agent. The method comprising the steps of: (a) using a web client to navigate to a website having a link offering to place the end-user in a real-time collaboration session with the call center agent; (b) clicking on the link to obtain a form; (c) completing the form; (d) submitting the form which is received by an application server that reviews the form and sends a service call to a collaboration server which establishes a new conference and then forwards a response having conference details about the new conference back to the application server which then forwards a conference invitation having conference details about the new conference to a queuing server which queues the conference invitation and then the application server connects the end-user to the new conference which is hosted by the collaboration server so the end-user can wait until the call center agent is available and accepts the conference invitation from the queuing server so the call center agent can join the new conference and take part in the real-time collaboration session; and (e) the collaboration server if desired can enable an automated call center agent to interact with and gather information from the end-user in the new conference while the end-user is waiting for the call center agent to join the new conference and take part in the real-time collaboration session.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
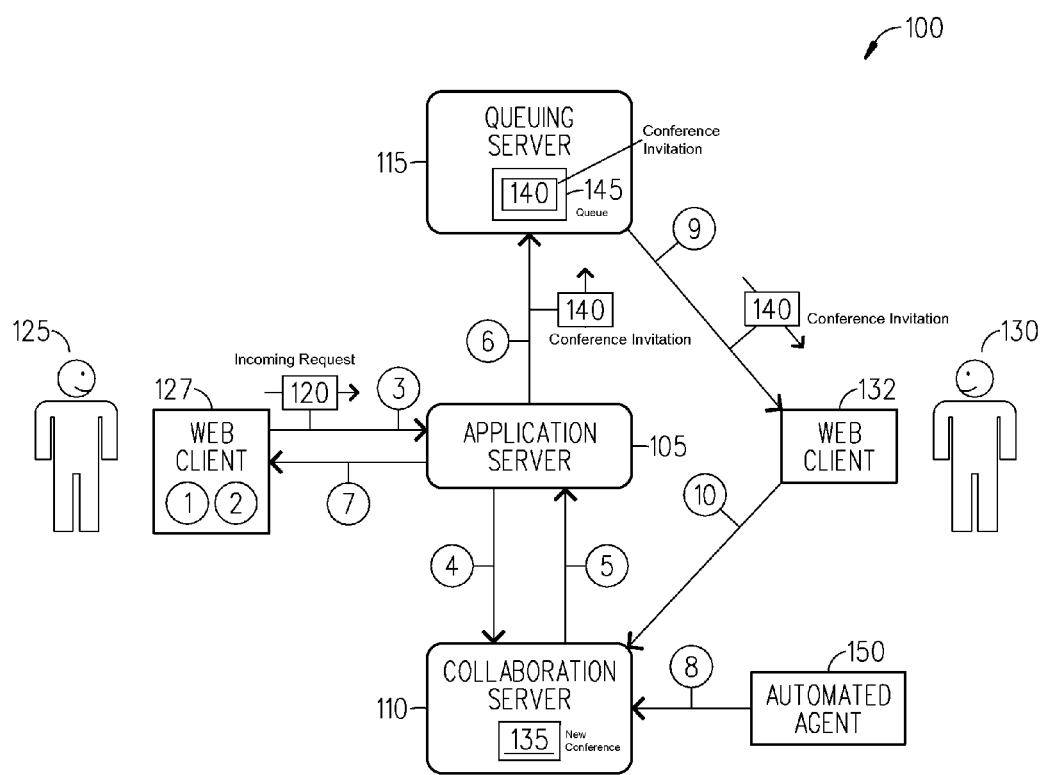
FIG. 1 is a block diagram illustrating the basic components of a real-time collaboration center in accordance with the present invention.

Referring to FIG. 1, there is a block diagram illustrating the basic components of a real-time collaboration center 100 in accordance with the present invention. As shown, the real-time collaboration center 100 includes an application server 105, a collaboration server 110 (e.g., MyTeamwork® Server 110) and a queuing server 115 (e.g., Genesys® Interaction Server 115). Basically, the real-time collaboration center 100 services an incoming request 120 from an end-user 125 (using a web-based client 127) to establish a real-time voice communication and data collaboration with a call center agent 130 (also using a web-based client 132). The real-time collaboration center 100 is able to service multiple end-users 125 at the same time with multiple call center agents 130 but for clarity only one end-user 125 and one call center agent 130 are discussed herein.

In operation, the application server 105 receives the incoming request 120 from the end-user 125 and interfaces with the collaboration server 110 to create a new conference 135 (or collaboration conference room 135) for the end-user 125. In addition, the application server 105 sends a collaboration invitation 140 to the queuing server 115 which places the collaboration invitation 140 in a queue 145 to wait for the next available call center agent 130. Once an available call center agent 130 accepts the collaboration invitation 140, the call center agent 130 enters the new conference 135 and begins to communicate/collaborate with the end-user 125 by using, for example, voice, instant messaging, file uploading, application/desktop sharing, video, other media or any combination thereof. As an option, while the end-user 125 is waiting for the call center agent 130 an automated call center agent 150 can enter the new conference 135 and take part in a real-time collaboration session with the end-user 125. The automated call center agent 150 may interact with the end-user 125 in an attempt to address their question(s) by using, for example, document uploading, voice interaction, speech recognition, video or any combination thereof.

Figure 2A:
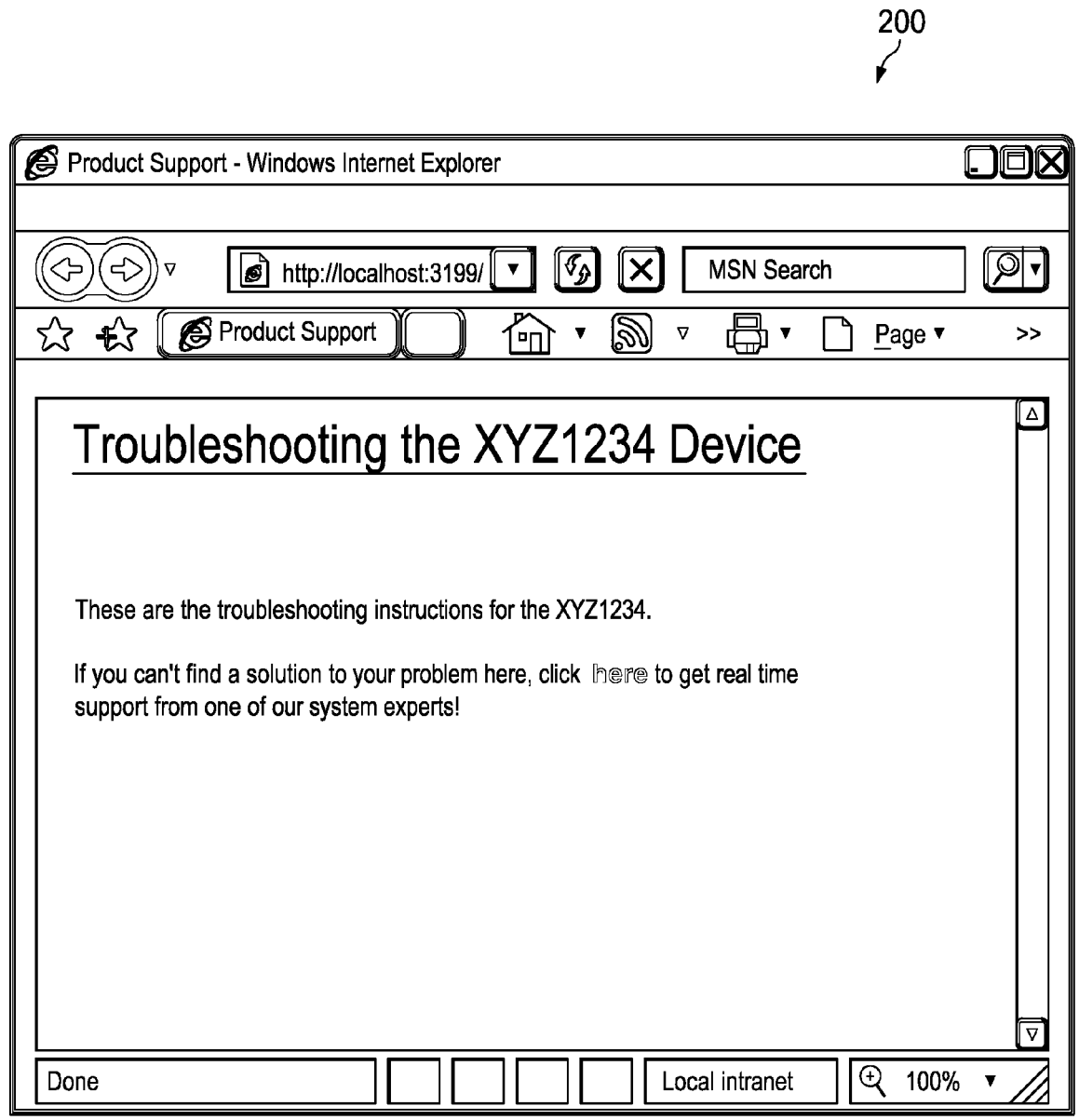
FIGS. 2A-2E are various diagrams which are used to help explain an exemplary scenario that can take place when a caller (end-user) interacts with the real-time collaboration center shown in FIG. 1 in accordance with the present invention.

The real-time collaboration center 100 effectively combines the browser-based collaboration features of the collaboration server 110 with the routing and call center features of the queuing server 115 to achieve a desired goal of enabling the real-time collaboration session between the end-user 125 and the call center agent 130. A detailed example is provided below to further explain the features and capabilities of the real-time collaboration center 100. In this example, the end-user 125 is seeking product support so they visit a vendor's website and enter a real-time collaboration session 135 where they are ultimately joined by a call center agent 130 (subject matter expert 130) (note: while reading the following example refer to FIG. 1 which illustrates the various steps 1-10 used to establish the real-time collaboration session between the end-user 125 and the call center agent 130). The steps are as follows:

1. The end-user 125 uses their web client 127 (e.g., computer 127) to navigate the Internet to a website support page 200 (see FIG. 2A). In this example, the website support page 200 includes a link (shown as "click here") which offers to place the end-user 125 into a real-time collaboration session with a call center agent 130.

Figure 2B:
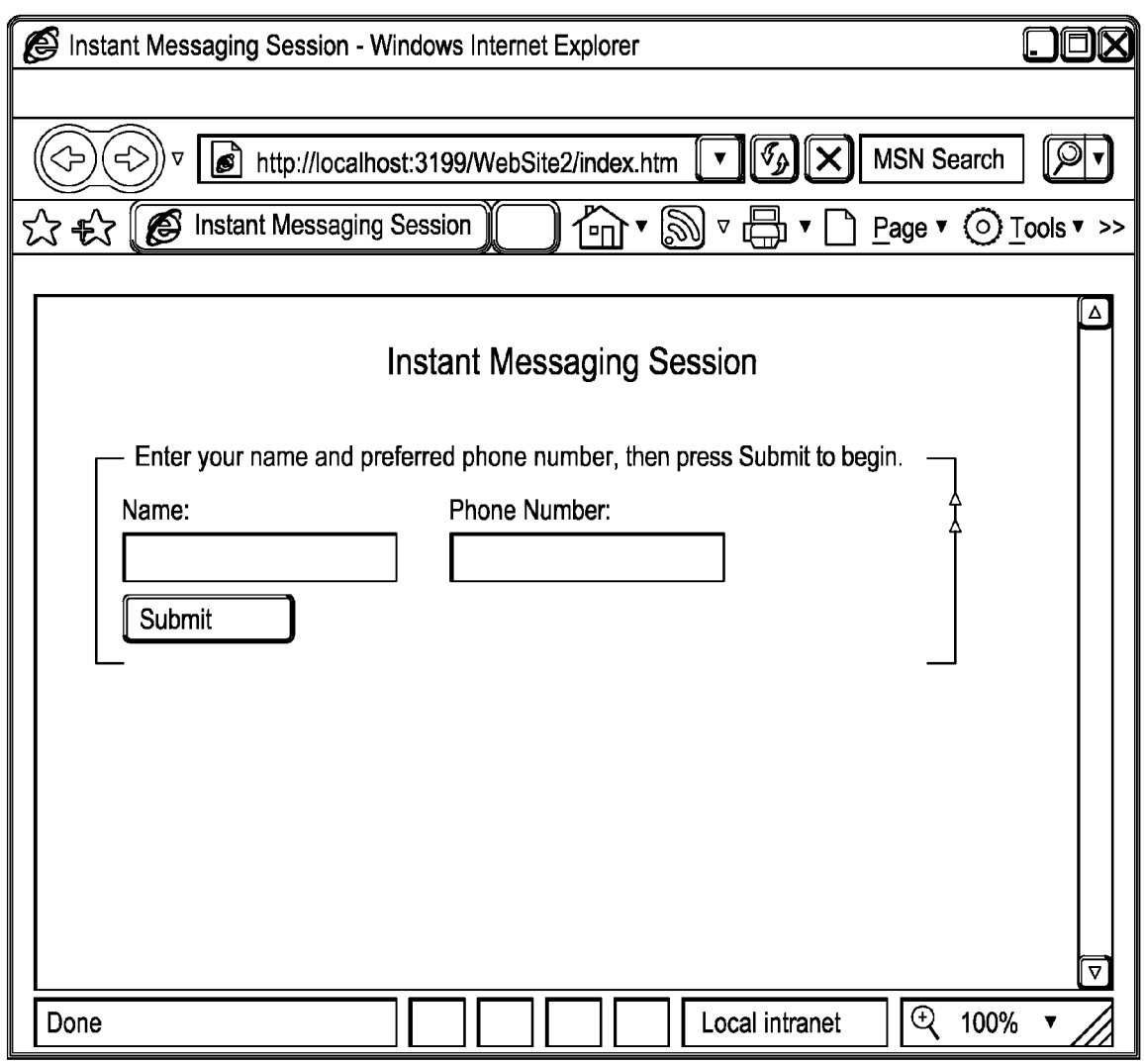

2. The end-user 125 clicks the link and is presented with a form 210 which requests, for example, the user's name and their preferred phone number (see FIG. 2B).

3. The end-user 125 fills in the requested information (e.g., name, phone number) and clicks the submit button to post the completed form 210. The completed form 210 can be posted to the application server 105 using HTTP (for example).

4. The application server 105 validates the entries on the completed form 210, and then sends a VCS XML service call (for example) to the collaboration server 110 to create a new conference 135. For example, the collaboration server 110 has the ability to receive and process an HTTP request (VCS XML service call) having the following form:

```
http://<server.domain.com>/cgi_bin/
vcs_conf_schedule?conf_type=reservationless&subject=new_conference
```

Upon receiving the HTTP request (VCS XML service call), the collaboration server 110 creates a new conference record and assigns Leader and Participant codes which are used to enable callers (end-user 125 and call center agent 130) to join the new conference 135. The collaboration server 110 then issues an HTTP response in XML format (for example) which provides the details of the newly provisioned conference 135 to the application server 105 (see step 5). For example, the HTTP response to the above request could have the following form:

```
<conferencetype="reservationless"id="148474396310564serve">
    <subject>new_conference</subject>
    <owner>user1@domain.com</owner>
    <join_url_root>/call/</join_url_root>
    <access type="leader" siteid="0">
        <vanity>0196199</vanity>
    </access>
    <access type="leader" state="active" siteid="0">
        <code>0196199</code>
    </access>
    <access type="participant" state="active" siteid="0">
        <code>0196198</code>
    </access>
</conference>
```

5. The application server 105 parses the response from the collaboration server 110 to capture the conference details, including the conference ID and the Leader and Participant codes. In the example used in step 4, the application server 105 would use an XML parsing routine to obtain the conference ID 148474396310564 server, as well as the Leader and Participant codes which are 0196199 and 0196198, respectively.

6. The application server 105 creates a conference invitation 140 by assembling a URL based on the domain address of the collaboration server 110 and the specific conference ID. The conference invitation 140 is forwarded to and then placed in the queue 145 of the queuing server 115. The queuing of the conference invitation 140 may be based, for example, on caller history, skill-matching, availability, and many other factors. Continuing with the example used in the previous steps 4-5, a URL to join the new conference 135 could have the following form:

```
http://<server.domain.com>/cgi_bin/vcs_call?action=
add&&vanity=0196199&call_callid=148474396310564server
```

Appending a phone number to this URL and having the call agent 130 send it to the collaboration server 110 results in a callback to the phone number with an invitation to the new conference 135 (see steps 9-10). This is how the call center agent 130 would be able to eventually join the end-user 125 in the collaboration session 135 (see step 10).

Figure 2C:
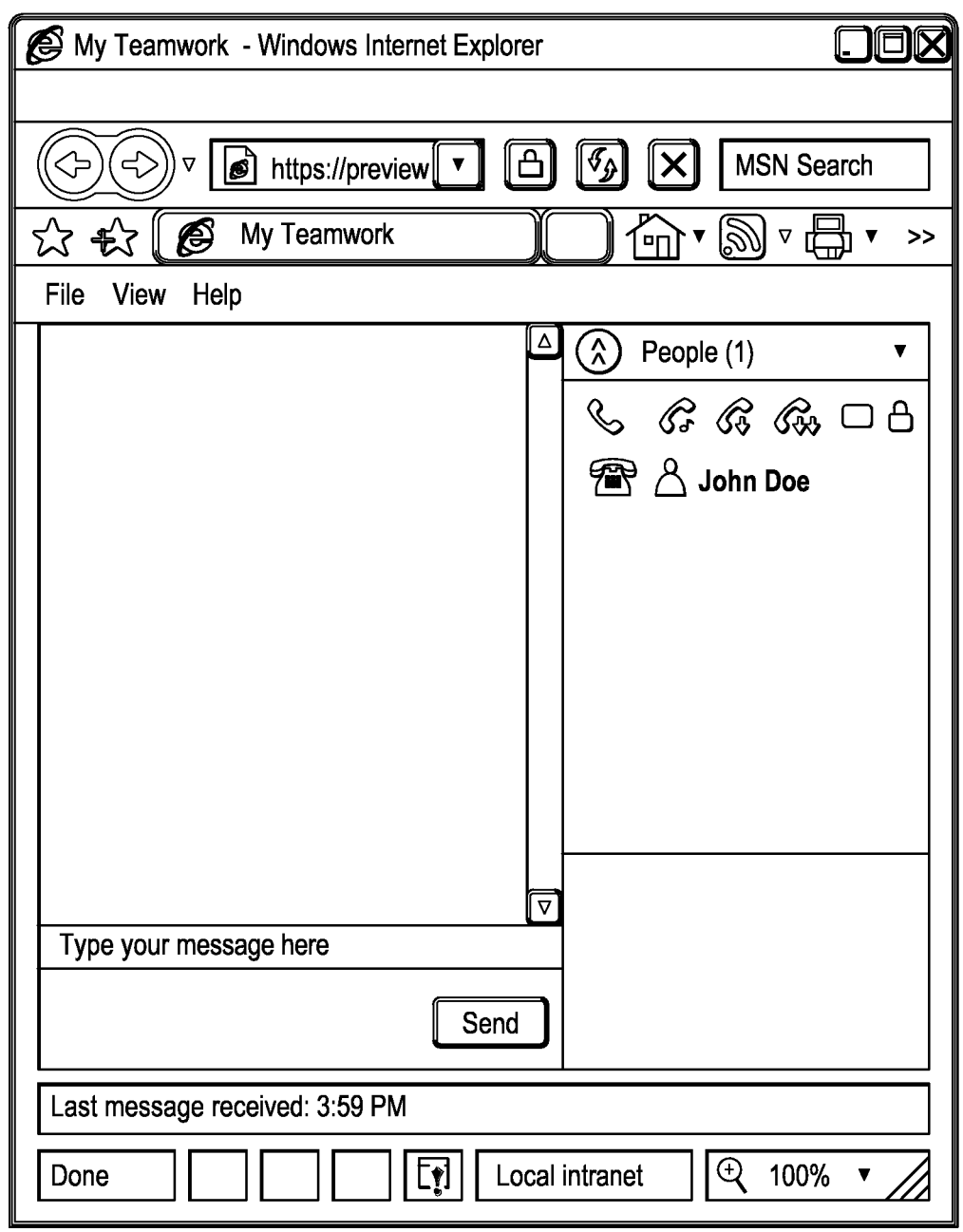

7. The application server 105 connects the end-user 125 to the new conference 135. At this time, a new window 220 (screen pop 220) appears on the end-user's web client 127, containing for example an instant messenger GUI (see FIG. 2C).

Figure 2D:
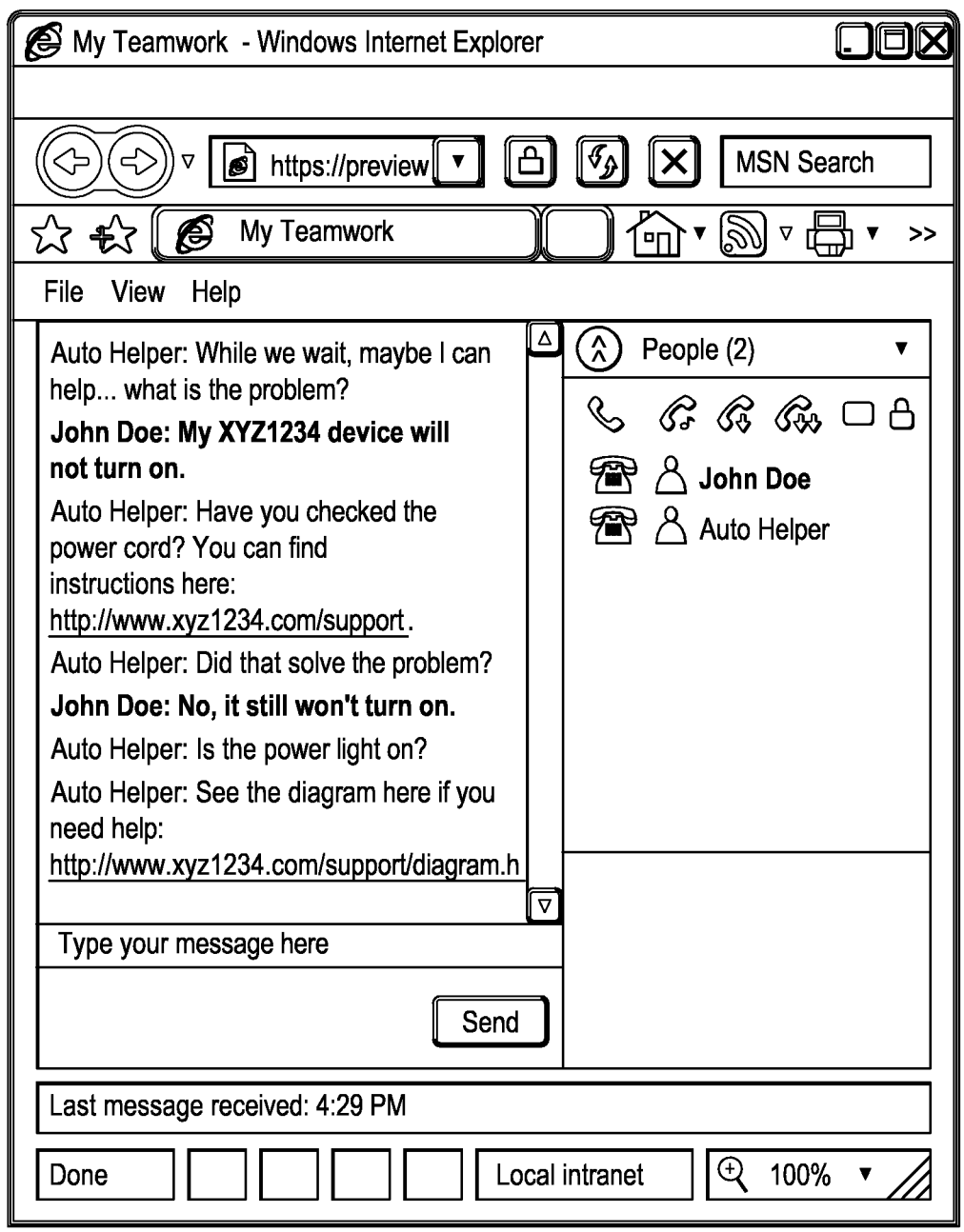

8. While the end-user 125 waits for a live call center agent 130, an optional automated agent 150 can "chat" with the end-user 125 to determine the nature of the end-user's problem. The automated agent 150 can have a goal to gather information, and perhaps to provide helpful automated responses. The possible interactions between the end-user 125 and the automated call center agent 150 include, for example, document upload, voice interaction and speech recognition, and video or any combination thereof (see exemplary instant messenger GUI 230 shown in FIG. 2D).

9. Assuming that the end-user 125 still prefers to collaborate with a human call center agent 130, the queuing server 115 will detect an available call center agent 130. And, when the queuing server 115 does this it sends the conference invitation 140 to the available call center agent 130.

10. The call center agent 130 accepts the conference invitation 140 and joins the new conference 135 to take part in a real-time collaboration session with the end-user 125. The conference history, including any dialogue between the end-user 125 and the automated call center agent 150 could be made available to the live call center agent 130. In addition, the call center agent 130 could record the voice and data session with the end-user 125.

Figure 2E:
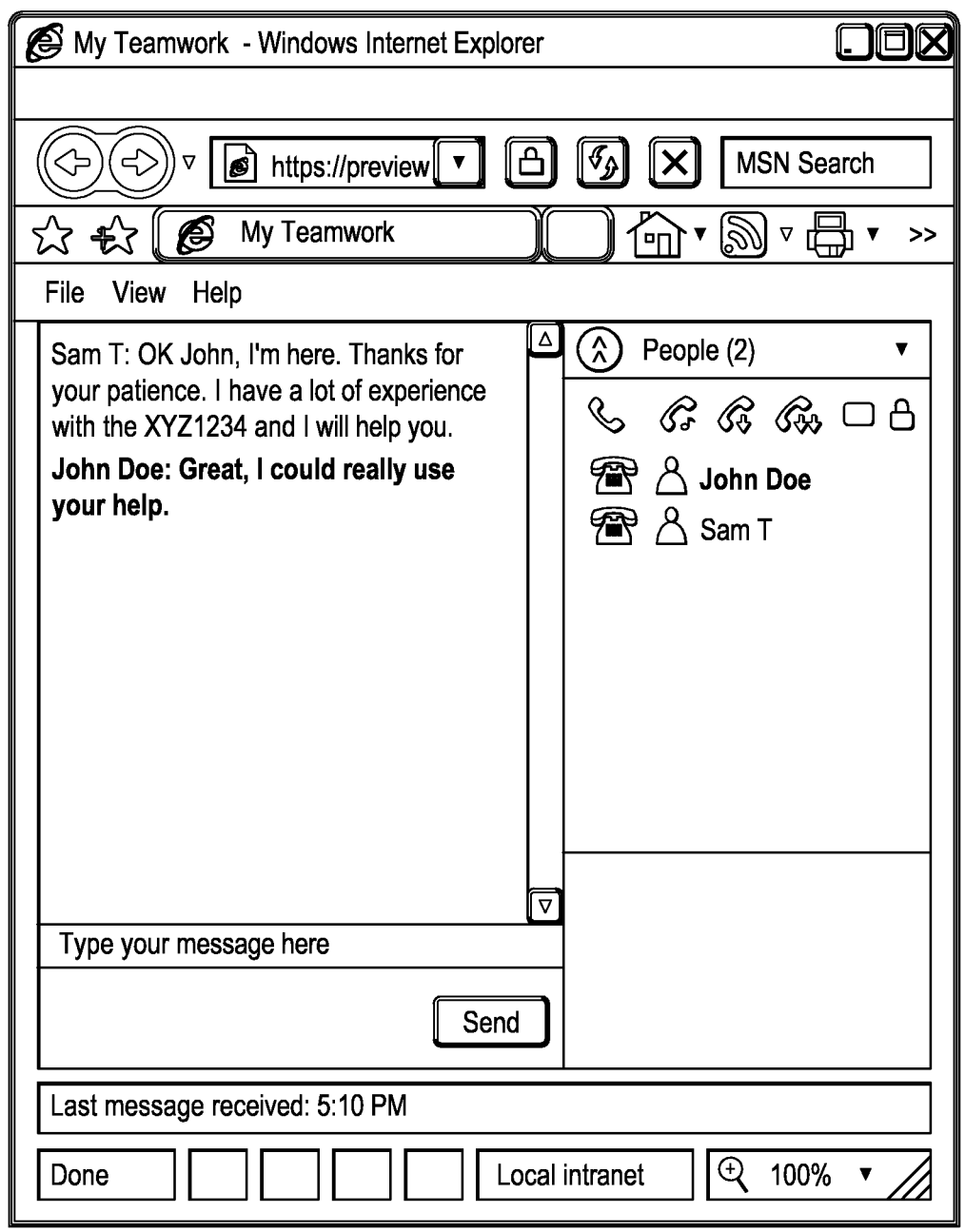

The end-user 125 and the call center agent 130 can now begin collaborating using web clients 127 and 132 (see exemplary instant messenger GUI 240 shown in FIG. 2E which would be displayed on both of the web clients 127 and 132). If either the end-user 125 or the call center agent 130 clicks to call the other party, then they will be joined together in a voice conference. In particular, the end-user 125 would be called back to join the conference at the phone number entered in the form 200 in step 3. And, the call center agent 130 would have already configured their web client 132 to their preferred phone number (e.g. desk phone, cell phone, etc), and this is where their callback would arrive so they can take part in the voice conference. If desired, the call center agent 130 can also conference in other call center agents and supervisors into the voice and data session.

Figure 3:
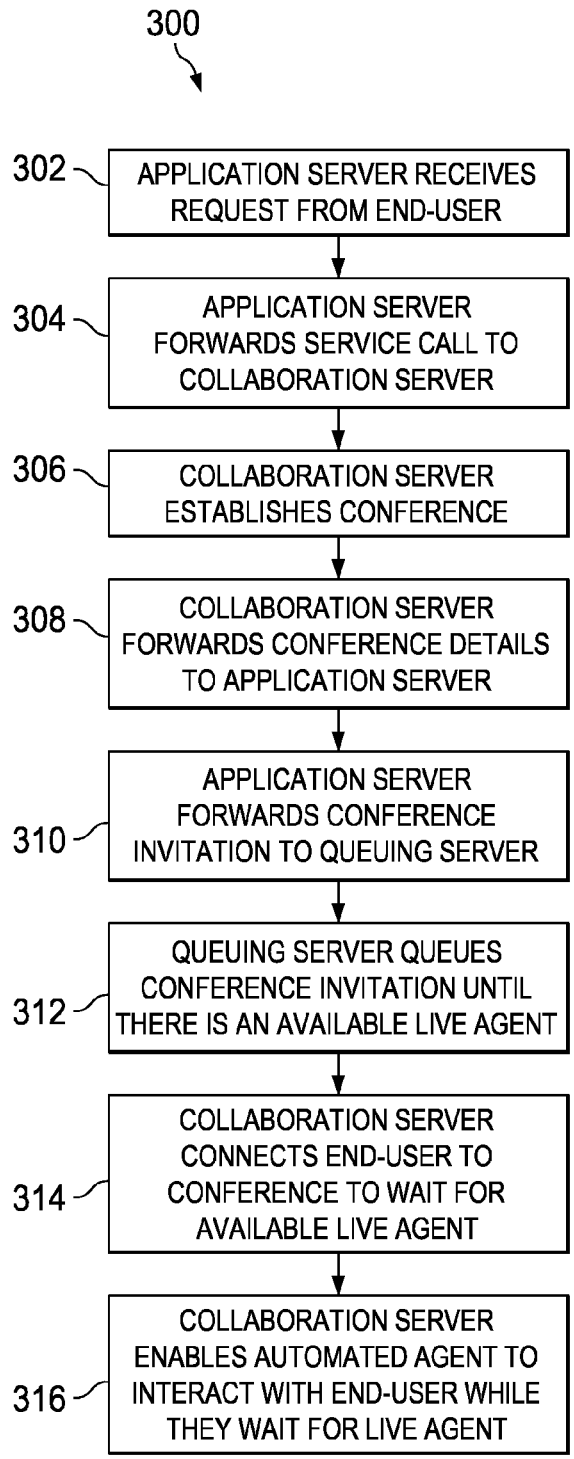
FIG. 3 is a flowchart illustrating the basic steps of a preferred method for establishing a real-time collaboration session between a caller (end-user) and a call center agent in accordance with the present invention.

Referring to FIG. 3, there is a flowchart illustrating the basic steps of a preferred method 300 for establishing a real-time collaboration session between an end-user 125 and a call center agent 130 in accordance with the present invention. Beginning at step 302, the application server 105 receives a request 120 from the end-user 125 who wants to have a real-time collaboration session with the call center agent 130 (see steps 1-3 in FIGS. 1-2). At step 304, the application server 105 forwards a service call to the collaboration server 110 (see step 4 in FIGS. 1-2). At step 306, the collaboration server 110 establishes a new conference 135 (see step 4 in FIGS. 1-2). At step 308, the collaboration server 110 forwards a response having conference details about the new conference 135 to the application server 105 (see step 5 in FIGS. 1-2). At step 310, the application server 105 forwards a conference invitation 140 having conference details about the new conference 135 to the queuing server 115 (see step 6 in FIGS. 1-2). At step 312, the queuing server 115 queues the conference invitation 140 until the call center agent 130 becomes available to interact with the end-user 125 (see step 6 in FIGS. 1-2). At step 314, the end-user 125 is connected to the new conference 135 which is hosted by the collaboration server 110 so the end-user 125 can wait until the call center agent 130 becomes available and accepts the conference invitation 140 from the queuing server 115 so the call center agent 130 can join the new conference 135 and take part in the real-time collaboration session (see steps 7 and 9-10 in FIGS. 1-2). At step 316 (optional), the collaboration server 110 further enables an automated call center agent 150 to interact with and gather information from the end-user 125 in the new conference 135 while the end-user 125 is waiting for the live call center agent 130 to join the new conference 135 and take part in the real-time collaboration session (see step 8 in FIGS. 1-2).

Figure 4:
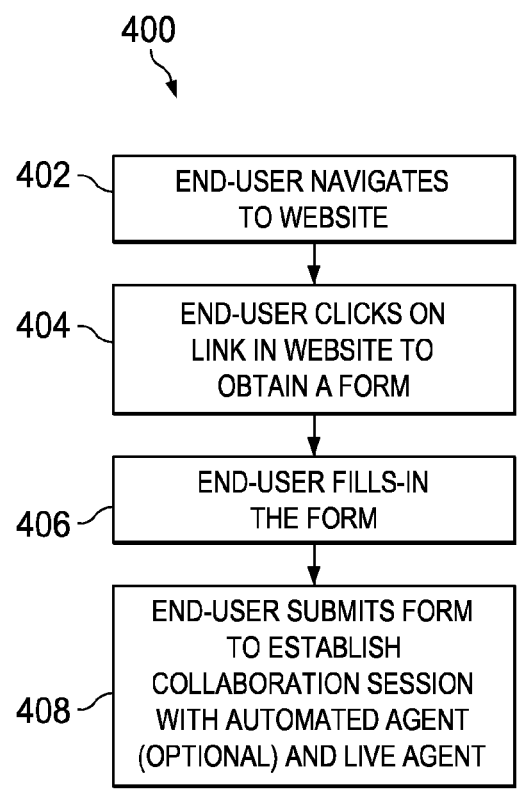
FIG. 4 is a flowchart illustrating the basic steps of a preferred method for enabling a caller (end-user) to establish a real-time collaboration session with a call center agent in accordance with the present invention.

Referring to FIG. 4, there is a flowchart illustrating the basic steps of a preferred method 400 for enabling an end-user 125 to establish a real-time collaboration session with a call center agent 130 in accordance with the present invention. Beginning at step 402, the end-user 125 uses their web client 127 (e.g., computer 127) to navigate to a website 200 having a link offering to place the end-user 125 in a real-time collaboration session with the call center agent 130 (see step 1 in FIGS. 1-2). At step 404, the end-user 125 uses their web client 127 and clicks on the link to obtain a form 210 (see step 2 in FIGS. 1-2). At step 406, the end-user 125 uses their web client 127 and completes the form 210 (see step 2 in FIGS. 1-2). At step 408, the end-user 125 users their web client 127 to submit the completed form 210 to the application server 105 (see step 3 in FIGS. 1-2). The application server 105 reviews the completed form 210 and sends a service call to the collaboration server 110 which establishes a new conference 135 and then forwards a response having conference details about the new conference 135 to the application server 105 (see steps 4-5 in FIGS. 1-2). Then, the application server 105 forwards a conference invitation 140 having conference details about the new conference 135 to the queuing server 115 which queues the conference invitation 140 (see step 6 in FIGS. 1-2). Thereafter, the end-user 125 is connected to the new conference 135 which is hosted by the collaboration server 110 so the end-user 125 can wait until the call center agent 130 is available and accepts the conference invitation 140 from the queuing server 115 so the call center agent 130 can join the new conference 135 and take part in the real-time collaboration session (see steps 7 and 9-10 in FIGS. 1-2). If desired, the collaboration server 110 further enables an automated call center agent 150 to interact with and gather information from the end-user 125 in the new conference 135 while the end-user 125 is waiting for the live call center agent 130 to join the new conference 135 and take part in the real-time collaboration session (see step 8 in FIGS. 1-2).

From the foregoing, it can be appreciated that the real-time collaboration center 100 can create a collaboration "waiting area" 135 where a call-center customer 125 can be serviced and/or entertained until they are joined in the session by an appropriate in-house subject matter expert 130 when he/she becomes available. While waiting in this collaboration "waiting area" 135, the customer 125 can first interact with a virtual agent 150 (i.e. non-human computer-based agent 150) that attempts to service the requests of the customer 125. This interaction can occur over one or more media channels such as IM, document sharing, voice, video, etc. . . . For example, the customer 125 might exchange IMs with the virtual agent 150, and this virtual agent 150 might also upload various documents to the collaboration "waiting area" 135 in an attempt to address the questions of the customer 125. The virtual agent 150 might also speak and listen to the customer 125, and/or exchange video and movie clips. Subsequently, if the virtual agent 150 does not address the concerns of the customer 125, then the real agent 130 when available can be joined to the collaboration "waiting area" 135 so they can participate in a multimedia collaboration with the customer 125. Additional agents 130 can also join the collaboration "waiting area" 135 if needed to also take part in a real-time multimedia collaboration with the customer 125.

The real-time collaboration center 100 effectively blends together the web-based voice and data collaboration features of the collaboration server 110 with the advanced routing and call center features of the queuing server 115 to provide an advanced, powerful, easy-to-use, capability for customers 125 using a web client 127 with a standard web browser to access a call center 100. As can be appreciated, the real-time collaboration center 100 has a variety of desirable features and advantages some of which are as follows:

1. Instead of routing a caller 125 to an agent 130, as in the prior art, this approach places the caller 125 in a waiting room 135, and then routes the agent 130 to the caller 125.

2. A non-human agent 150 can first interact with the waiting caller 125, using one or more multimedia channels, in an attempt to service the caller's requests before connecting the live agent 130.

3. Neither the caller 125 nor the agent 130 require any special software, instead only a web browser is required. As such, the caller 125 and the agent 130 can access the waiting room 135 from anywhere in the world.

4. The caller 125 and agent 130 if they want to they can use standard telephones—no special PBX capabilities, or CTI links—to communicate with one another.

5. The real-time collaboration center 100 provides a full range of interaction possibilities (for example): voice, video, instant messaging, and application/desktop sharing.

6. The real-time collaboration center 100 potentially reduces the workload of live call center agents 130. For instance, the live call center agent 130 may not be needed if the automated agent 150 who first interacts with the caller 125 is able to diagnose and solve the caller's problem.

7. The real-time collaboration center 100 can match the caller's issue to the appropriate live agent 130 that has the desired skill set. For instance, after reviewing the interaction between caller 125 and the automated agent 150, the live agent 130 who decides to join the caller 125 in the collaboration session 135 should be able to more likely solve the caller's problem.

Although one embodiment of the present invention has been illustrated in the accompanying Drawings and described in the foregoing Detailed Description, it should be understood that the present invention is not limited to the disclosed embodiment, but is capable of numerous rearrangements, modifications and substitutions without departing from the spirit of the invention as set forth and defined by the following claims.

The invention claimed is:

1. A method for establishing a real-time collaboration session between an end-user and a call center agent, said method comprising the steps of:

receiving, at an application server, a request from a web-based client associated with an end-user who wants to have a real-time collaboration session with a call center agent;

forwarding, from the application server, an http request to a collaboration server;

establishing, at the collaboration server, a new conference;

forwarding, from the collaboration server, an http response having conference details about the new conference to the application server;

forwarding, from the application server, a conference invitation having conference details about the new conference to a queuing server;

queuing, at the queuing server, the conference invitation until the call center agent becomes available to interact with the end-user; and connecting the end-user to the new conference, through the end user web-based client, which is hosted by the collaboration server, wherein said collaboration server (i) enables an automated call center agent to interact with the end-user, gather information from the end-user and provide responses to the end-user in the new conference to attempt to diagnose and solve a problem experienced by the end-user while the end-user is waiting for the call center agent to join the new conference and take part in the real-time collaboration session, and (ii) enables the call center agent, through a call center agent web based client, and the end-user to collaborate using voice, instant messaging, file uploading, desktop sharing, video or any combination thereof.

2. The method of claim 1, wherein said collaboration server further enables the call center agent to add at least one more call center agent into the real-time collaboration session with the end-user.

3. The method of claim 1, wherein said collaboration server further enables the call center agent to record the real-time collaboration session with the end-user.

4. The method of claim 1, wherein said collaboration server further enables the automated call center agent and the end-user to collaborate via document uploading, voice interaction, speech recognition, video or any combination thereof.

5. The method of claim 1, wherein said collaboration server further enables the call center agent to review communications that were exchanged between the end-user and the automated call center agent.

6. A real-time collaboration center, comprising:
an application server that receives a request from a web-based client associated with an end-user who wants to have a real-time collaboration session with a call center agent;
a collaboration server that receives an http request from the application server and upon receiving the request establishes a new conference, and forwards an http response having conference details about the new conference to the application server; and
a queuing server that receives a conference invitation having conference details about the new conference from said application server and then queues the conference invitation until the call center agent becomes available to interact with the end-user,
wherein said application server further connects the end-user to the new conference hosted by said collaboration server through the end user web-based client, and
wherein said collaboration server (i) enables an automated call center agent to interact with the end-user, gather information from the end-user and provide responses to the end-user in the new conference to attempt to diagnose and solve a problem experienced by the end-user while the end-user is waiting for the call center agent to join the new conference and take part in the real-time collaboration session, and (ii) enables the call center agent, through a call center agent web based client, and the end-user to collaborate using voice, instant messaging, file uploading, desktop sharing, video or any combination thereof.

7. The real-time collaboration center of claim 6, wherein said collaboration server further enables the call center agent to add at least one more call center agent into the real-time collaboration session with the end-user.

8. The real-time collaboration center of claim 6, wherein said collaboration server further enables the call center agent to record the real-time collaboration session with the end-user.

9. The real-time collaboration center of claim 6, wherein said collaboration server further enables the automated call center agent and the end-user to collaborate via document uploading, voice interaction, speech recognition, video or any combination thereof.

10. The real-time collaboration center of claim 6, wherein said collaboration server further enables the call center agent to review communications that were exchanged between the end-user and the automated call center agent.

11. A method for enabling an end-user to establish a real-time collaboration session with a call center agent, said method comprising the steps of:
using a web-based client to navigate to a website having a link offering to place an end-user in a real-time collaboration session with a call center agent;
clicking on the link to obtain a form;
completing the form; and
submitting the form to an application server that is operable to send an http request to a collaboration server which is operable to establish a new conference and forward an http response having conference details about the new conference back to the application server which is further operable to
forward a conference invitation having conference details about the new conference to a queuing server which is operable to query the conference invitation and
connect the end-user to the new conference, through the web-based client, which is hosted by the collaboration server,
wherein said collaboration server (i) enables an automated call center agent to interact with the end-user, gather information from the end-user and provide responses to the end-user in the new conference to attempt to diagnose and solve a problem experienced by the end-user while the end-user is waiting for a call center agent to join the new conference and take part in the real-time collaboration session and (ii) enables the call center agent, through a call center agent web based client, and the end-user to collaborate using voice, instant messaging, file uploading, desktop sharing, video or any combination thereof.

12. The method of claim 11, wherein said collaboration server further enables the call center agent to add at least one more call center agent into the real-time collaboration session with the end-user.

13. The method of claim 11, wherein said collaboration server further enables the automated call center agent and the end-user to collaborate via document uploading, voice interaction, speech recognition, video or any combination thereof.

14. The method of claim 11, wherein said collaboration server further enables the call center agent to review communications that were exchanged between the end-user and the automated call center agent.

* * * * *